US010933355B2

(12) United States Patent
Jalenques

(10) Patent No.: US 10,933,355 B2
(45) Date of Patent: Mar. 2, 2021

(54) FILTER BAG INCORPORATING A DEVICE TO FACILITATE THE REMOVAL OF A FILTRATE

(71) Applicant: Interscience, St Nom la Breteche (FR)

(72) Inventor: Emmanuel Jalenques, St Nom la Breteche (FR)

(73) Assignee: INTERSCIENCE, St Nom la Brèteche (FR)

( * ) Notice: Subject to any disclaimer, the term of this patent is extended or adjusted under 35 U.S.C. 154(b) by 200 days.

(21) Appl. No.: 16/028,788

(22) Filed: Jul. 6, 2018

(65) Prior Publication Data
US 2019/0009193 A1 Jan. 10, 2019

(30) Foreign Application Priority Data
Jul. 6, 2017 (FR) ...................................... 17 56389

(51) Int. Cl.
*B01D 29/27* (2006.01)
*B01D 3/00* (2006.01)
(Continued)

(52) U.S. Cl.
CPC .............. *B01D 29/27* (2013.01); *B01L 3/505* (2013.01); *G01N 1/34* (2013.01); *G01N 1/4077* (2013.01);
(Continued)

(58) Field of Classification Search
CPC ................ B01D 29/27; B01D 2201/40; B01D 2201/184; B01D 61/00; G01N 1/4077;
(Continued)

(56) References Cited

U.S. PATENT DOCUMENTS

| 5,855,434 A | 1/1999 | Hagen |
| 2017/0022470 A1* | 1/2017 | Calemczuk ............ C12M 23/26 |
| 2018/0127797 A1* | 5/2018 | Brutinel .................... C12M 1/34 |

FOREIGN PATENT DOCUMENTS

| EP | 0677832 A1 | 10/1995 |
| FR | 2691374 A1 | 12/1994 |

(Continued)

OTHER PUBLICATIONS

French National Institute of Industrial Property, Preliminary Search Report, dated Mar. 13, 2018, 7 pages, French National Institute of Industrial Property, Courbevoie Cedex, France.

*Primary Examiner* — Waqaas Ali
(74) *Attorney, Agent, or Firm* — Thomas P. O'Connell; O'Connell Law Firm

(57) ABSTRACT

A filter bag comprising with a wall structure defining an inner volume with an opening. The wall structure extends from a bottom to the opening. A filter extends from the bottom toward the opening to separate the inner volume into a sample receiving compartment and a filtrate collection compartment. An orifice in the wall structure is in communication with the filtrate collection compartment, and a closure system has a closed state wherein access through the orifice is prevented and an open state wherein access through the orifice is permitted. The closure system can have a moveable part operative to selectively seal the orifice and a stationary part fixed to the wall structure with a separative limit therebetween. A fastening system can selectively retain a foldable portion of the wall structure against the wall structure to adjust the opening from an open state to a closed state.

13 Claims, 3 Drawing Sheets

(51) Int. Cl.
*B01D 61/00* (2006.01)
*G01N 1/40* (2006.01)
*G01N 1/34* (2006.01)
*B01L 3/00* (2006.01)

(52) U.S. Cl.
CPC .... *B01D 2201/184* (2013.01); *B01D 2201/40* (2013.01); *B01L 2200/0689* (2013.01); *B01L 2300/0681* (2013.01); *G01N 2001/4088* (2013.01)

(58) Field of Classification Search
CPC .... G01N 2001/4088; G01N 1/34; G01N 1/10; B01L 3/505; B01L 2300/0681; B01L 2200/0689
See application file for complete search history.

(56) References Cited

FOREIGN PATENT DOCUMENTS

| FR | 2938449 A1 | 5/2010 | |
|----|------------|--------|----|
| WO | WO-0113818 A1 * | 3/2001 | ........... A61D 19/022 |
| WO | WO0113818 A1 | 3/2001 | |
| WO | WO2015150714 A1 | 10/2015 | |
| WO | WO2016067307 A1 | 5/2016 | |
| WO | WO-2017019345 A1 * | 2/2017 | .............. C12M 1/34 |

* cited by examiner

FILTER BAG INCORPORATING A DEVICE TO FACILITATE THE REMOVAL OF A FILTRATE

RELATED APPLICATION

This application claims priority to French Application No. 1756389, filed Jul. 6, 2017, which is incorporated herein by reference to the extent permitted by law.

FIELD OF THE INVENTION

The present invention relates generally to the field of sampling and sample preparation for analysis and, more particularly, to the preparation and collection of a filtrate from a solid sample. Solid samples may, for instance, be fibrous, non-homogeneous, insoluble. The filtrate may, for instance, be viscous or pasty. The analysis of the filtrate may be microbiological. Embodiments of the invention may comprise a filter bag that can be used for the preparation of a filtrate from a solid sample.

BACKGROUND OF THE INVENTION

Filter bags can be used, for instance, when a sample to be analyzed is solid and has low solubility and/or is difficult to manipulate and/or is potentially pathogenic and/or is an "on-site sample" that must not be contaminated.

In general, microbiological analysis processes require samples to be analyzed in liquid form. Most filter bags have two compartments separated by a filter. One compartment is intended to receive the solid sample, and the other compartment is intended to receive the filtrate. A liquid, for example a physiological or a culture medium, is placed in the bag. In its compartment, the sample is in contact with a liquid. The amount of liquid used is often low and represents only a small volume at the bottom of the bag. The contents may be stirred to promote the suspension of fragments and/or the solubilization of solid sample objects in the liquid. All or part of the filtrate is then taken for analysis.

The sampling phase of the filtrate in the filter bag by an operator is often complex, due at least in part to the need for it typically to be carried out in a secure area of the laboratory, such as under a fume hood or in a microbiological safety station. In addition, this sampling phase or step is delicate because, for instance, the operator must hold the bag in one hand and the filtrate removal device in the other hand. In some cases, this stage is particularly crucial, such as when the filtrate contains potentially pathogenic agents.

Prior art filter bags that do not include a sampling device is well-known. Sampling of a filtrate is not feasible with these standard sampling devices. In fact, access to the filtrate via standard sampling devices is not possible without risking contaminating the filtrate through contact with the sampling device or vice versa. Filter bags equipped with a sampling system do already exist, but they require complex manipulation of the sampling system before or at the same time as sampling.

There is a need for a filter bag that overcomes one or more of the aforementioned shortcomings of the prior art. For instance, a filter bag with a safety feature to prevent leakage or spillage of the filtrate during handling or storage of the bag would be advantageous. Furthermore, it would be a useful contribution to the art to provide a filter bag that enables filtrate collection in a simple and straightforward manner, including when the bag contains only a small amount of filtrate. Still further, there is a need in the art for a filter bag that would allow several successive samples of filtrate parts to be taken while hermetically sealing the filter bag between each sample.

SUMMARY OF THE INVENTION

The present invention is thus founded on the broadly stated object of providing a filter bag that overcomes, at least in part, the aforementioned drawbacks from which the prior art has suffered. In certain embodiments, another purpose of the is to provide a filter bag with a safety feature to prevent leakage or spillage of the filtrate during handling or storage of the bag. An additional purpose of embodiments of the invention is to provide a filter bag that allow for the filtrate to be collected in a simple and straightforward manner, including when the bag contains only a small amount of filtrate. Yet another purpose of embodiments of the invention is to provide a filter bag that allows for several successive samples of filtrate parts to be taken while hermetically sealing the filter bag between each sample.

One manifestation of the invention can be characterized as a filter bag with the following features:
  a bottom;
  an opening;
  a wall delimiting an interior volume of the bag and extending between the bottom and the opening of the bag;
  a filter extending from the bottom towards the opening and separating the interior volume into two compartments, the two compartments being a sample receiving compartment arranged to receive a sample and a filtrate collection compartment arranged to receive a filtrate.

According to particular embodiments of the invention, the filter bag can include an orifice passing through the aforementioned wall and housed in the filtrate collection compartment. A closure system can be provided allowing for two states: a closed state wherein access to the filtrate from the outside of the bag by the orifice is prevented and an open state wherein access from the outside of the bag to the filtrate through the orifice is permitted. The closure system is arranged to go from a closed state to an open state and vice versa.

In certain practices of the invention, the filter may, for example, be in the form of a strip. The filter may, for example, be a filtering membrane type. The filter can be arranged to allow the introduction of the sample into the receiving compartment via the opening. Embodiments of the filter bag can, for example have a volume of the sample receiving compartment greater than a volume of the filtrate in the collection compartment. The size of the orifice can vary, such as between 2 and 40 mm, but it will ideally be between 8 and 20 mm.

In manifestations of the filter bag, the closure system may comprise a tab. The tab could, for instance, have a moveable part and a stationary part. The stationary part of the tab can be fixed to the wall. The moveable part of the tab can be selectively operative to seal the orifice when the closure system is in a closed state. The moveable part can be operative to place the orifice in a clear or open condition when the closure system is in an open state.

When the closure system is in its closed state, the moveable part of the tab of the closure system may provide an airtight seal for the orifice. The moveable part of the tab of the closure system may be mobile relative to the bag. When the closure system is in its closed state, the moveable part of the tab of the closure system may cover the orifice. A surface of the stationary part of the tab may be less than a surface of the mobile part of the tab.

When the closure system is in its open state, the moveable part of the tab of the closure system can, in certain practices, be arranged to be away from the orifice and to maintain a remote position in relation to the orifice thereby to keep access to the orifice open.

The moveable part of the tab of the closure system may include one or more detachable fixation areas, which may alternatively be referred to as reversible fixation areas, arranged to be reversibly fixed to one or more reversible fixation areas of the wall in which the orifice is disposed. For example, the one or more reversible fixation areas of the wall in which the orifice is disposed can be located around the periphery of the orifice. The reversible or detachable fixation areas can be removably affixed to the wall of the filter bag. As used herein, reference to fixing in a reversible way or a reversible fixation is intended to mean that the moveable portion of the closure system can be selectively detached from the wall of the filter bag.

It is contemplated that the one or more reversible fixation areas of the wall in which the orifice may be disposed can be complementary to one or more of the reversible fixation areas of the mobile part of the tab of the closure system.

It is further contemplated that a section of the wall located around the periphery of the orifice can be devoid of a reversible fixation area.

When the closure system is in its closed state, the one or more reversible fixation areas of the mobile part of the closure system tab can be fixed, in a reversible manner, to the reversible fixation area or areas of the wall in which the orifice is disposed. When the closure system is in its open state, the one or more reversible fixation areas of the mobile part of the closure system tab may be detached, non-obstructive, and/or remote in relation to the one or more reversible fixation areas of the wall in which the orifice is housed.

The stationary part of the tab of the closure system may include one or more irreversible fixation areas fixed, irreversibly, to one or more irreversible fixation areas of the wall in which the orifice is disposed. The one or more irreversible fixation areas of the wall in which the orifice may be disposed may be complementary or corresponding to the one or more irreversible fixation areas of the mobile part of the tab of the closure system. As taught herein, a part of the wall located on the periphery of the orifice may include one or more irreversible fixation areas.

The irreversible fixation areas of the wall in which the orifice may be disposed can, in certain embodiments, be situated between the orifice and the bottom of the filter bag. In embodiments of the invention, the tab of the closure system can extend predominantly in a direction connecting the opening of the bag to the bottom of the bag. In particular practices, the tab of the closure system can have a predominantly oblong shape. Where the tab of the closure system has, for example, a predominantly oblong shape, the tab can extend predominantly in a direction connecting the opening of the bag to the bottom of the bag.

The filter bag can have a separative limit, which separative limit may be interpreted to comprise an interface or separation area. According to particular embodiments of the invention, for example, a separative limit can be disposed between the mobile part and the stationary part of the tab of the closure system tab. The separative limit can be curved. As used herein, curved may be interpreted as non-rectilinear. The separative limit can be non-continuous. The separative limit, which can be between the mobile part and the stationary part of the tab of the closure system, can include convex parts, which can extend predominantly to the side of the mobile part of the tab of the closure system. The convex parts can be formed, for example, by a pattern of convex shapes from the stationary part of the tab of the closure system to the mobile part of the tab of the closure system. The separative limit between the mobile part and the stationary part of the tab of the closure system can, in certain examples, include convex parts separated by predominantly rectilinear parts.

When the separative limit between the mobile part and the stationary part of the tab of the closure system includes one or more rectilinear parts, a length of a convex part in the direction in which the separative limit predominantly extends between the mobile part and the stationary part of the tab of the closure system may be greater than a length of a rectilinear part in the aforementioned direction in which the separative limit predominantly extends between the mobile part and the stationary part of the tab. The convex parts of the separative limit between the mobile part and the stationary part of the tab of the closure system may have a predominantly circular shape.

The one or more reversible fixation areas of the closure system tab may be of an adhesive type. Where the one or more reversible fixation areas of the wall in which the orifice is disposed are complementary to the one or more reversible fixation areas of the mobile part of the tab of the closure system, the closure system may, by way of example and not limitation, comprise a toothed-rack closure, commonly known as a zip closure, a hook and loop closure, or some other closure system as may be obvious to a person skilled in the art after reading the present disclosure.

According to embodiments of the invention, the filter bag may include a fastening system arranged to be fixed, reversibly, on a part of the bag on the side of the opening so that a foldable portion of the filter bag can be folded towards the bottom of the bag to be operative as a flap.

The aforementioned fastening system allows for two states, a closed state and an open state. In the closed state, access to the interior volume from the outside of the bag by the opening is prevented. In the open state, access to the interior volume from the outside of the bag by the opening is permitted. The part of the bag on which the fastening system is fixed may preferably be located on the side of the wall in which the orifice is disposed.

The fastening system may include a tab, the aforementioned tab can have a stationary part and a mobile part. The stationary part can be fixed, in an irreversible way, to one or more of the irreversible fastening areas of the wall. The mobile part is operative, when the fastening system is in its open state, to be fixed, in a reversible manner, to one or more reversible fastening areas contiguous to the irreversible fastening area or areas of the aforementioned wall to which the stationary part of the fastening system tab is fixed or to be folded in the direction of the stationary part of the tab of the fastening system. When the fastening system is in its closed state, the tab can be fixed, reversibly, to one or more reversible fastening areas of the wall of the folded part. The wall including the one or more irreversible fastening areas on which the stationary part is fixed may preferably be located on the same side as the orifice.

When the fastening system is in its open state, the mobile part of the fastening system tab may be arranged to be folded toward the stationary part of the fastening system tab and to stay in the folded position.

The mobile part of the fastening system tab may include one or more reversible fastening areas, arranged to be fixed, in a reversible manner, either to one or more reversible fastening areas contiguous to the irreversible fastening area or areas of the aforementioned wall to which the stationary part is fixed or to one or more of the reversible area or areas of the wall of the folded part.

The one or more reversible fastening areas of the mobile part of the fastening system tab may, for example, be complementary to the one or more reversible fastening areas contiguous to the irreversible fastening areas of the wall to which the stationary part is fixed to the fastening system tab or to the one or more fastening areas or reversible areas of the wall of the folded part.

When the fastening system is in its open state, the one or more reversible fastening areas of the mobile part of the fastening system tab may be fixed, in a reversible manner, to the reversible fastening area or areas contiguous to the irreversible fastening area or areas of the wall to which the stationary part of the tab is fixed. When the fastening system is in its open state, the reversible fastening area or areas of the mobile part of the fastening system tab may not be fixed to the reversible fastening area or areas of the wall of the folded part. When the fastening system is in its closed state, the reversible fastening area or areas of the mobile part of the fastening system tab may be fixed, reversibly, to the reversible area or areas of the wall of the folded part. The stationary part of the fastening system tab may include one or more areas of irreversible fastening fixed to one or more fastening areas of the wall. The fastening system tab may be extended primarily in a direction that connects the bag opening to or toward the bottom of the bag.

A separative limit between the mobile part and the stationary part of the fastening system tab may be curved. The separative limit between the mobile part and the stationary part of the fastening system tab may include convex parts extending predominantly to the side of the mobile part of the fastening system tab. The aforementioned convex parts may be formed by a pattern of convex shapes from the stationary part of the fastening system tab to the mobile part of the fastening system tab.

The reversible fixation area or areas of the fastening system tab may, by way of example and not limitation, be of an adhesive type. When the reversible fastening area or areas of the fastening system are of an adhesive type, the reversible fastening area or areas from the wall of the folded part may be located on any part of the wall of the folded part and the reversible fastening area or areas contiguous to the irreversible fastening area or areas of the wall to which the stationary part of the fastening system tab is fixed may be in any position along the wall to which the stationary part of the fastening system tab is fixed.

When the reversible fastening or areas of the mobile part of the fastening system tab are complementary to the reversible fastening area or areas contiguous to the irreversible fastening area or areas of the wall to which the stationary part of the tab is fixed, the closure system may, for example and not in a limiting way, comprise a toothed-rack closure, commonly known as a zip closure, a hook and loop closure, or any other type of closure that might be obvious to one skilled in the art after reviewing the present disclosure.

In a strictly equivalent way, the stationary part of the fastening system tab may be fixed to one or more areas of the irreversible fastening areas of a wall of the folded part. The mobile part of the fastening system may be arranged so that, when the fastening system is in its open state, it may be fixed, in a reversible manner, to one or more reversible fastening areas contiguous to the irreversible fastening area or areas of the aforementioned wall of the folded part to which the stationary part of the fastening system tab is fixed, or it may be folded towards the stationary part of the fastening system tab, and, when the fastening system is in its closed state, it may be fixed, reversibly, to one or more reversible fastening areas of a filter bag wall.

According to embodiments of the invention, the orifice may be located between a maximum liquid level that the bag is arranged to receive and an irreversible fastening area of the fastening system tab or one of the irreversible fastening areas of the fastening system tab located closest to the bottom of the bag.

According to embodiments of the invention, a reversible fastening area of the fastening system tab may be located between the orifice in the bag and the opening of the bag.

According to embodiments of the invention, the orifice may be located between the maximum liquid level that the bag can receive and an irreversible fastening area of the fastening system tab or one of the irreversible fastening areas of the fastening system tab located closest to the bottom of the bag. A reversible fastening area of the fastening system tab may be located between the orifice in the bag and the opening of the bag. The orifice may, in particular embodiments, be located in a half of the bag on the same side as the bottom of the bag.

The foregoing discussion broadly outlines certain goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

Other advantages and particularities of the invention will become apparent on review of the present disclosure, including, but by no means limited to, the accompanying drawings, wherein.

DETAILED DESCRIPTION OF PREFERRED EMBODIMENTS

The implementation methods and structures described and shown herein are by no means limiting and are merely provided to ensure a complete understanding of the filter bag disclosed herein. One might consider, for example, variations of the filter bag comprising only a selection of one or more of the disclosed characteristics, isolated from the other characteristics disclosed, even where such a selection may be within a description or depiction of other characteristics. Such selections of characteristics may be sufficient to confer a technical advantage or to differentiate the invention from the prior art. Selections of characteristics may be or be considered as functional characteristics without structural limitations or with only certain structural details if those details alone are sufficient to confer a technical advantage or for differentiate the filter bag or a portion thereof from the prior art.

Figure 1:
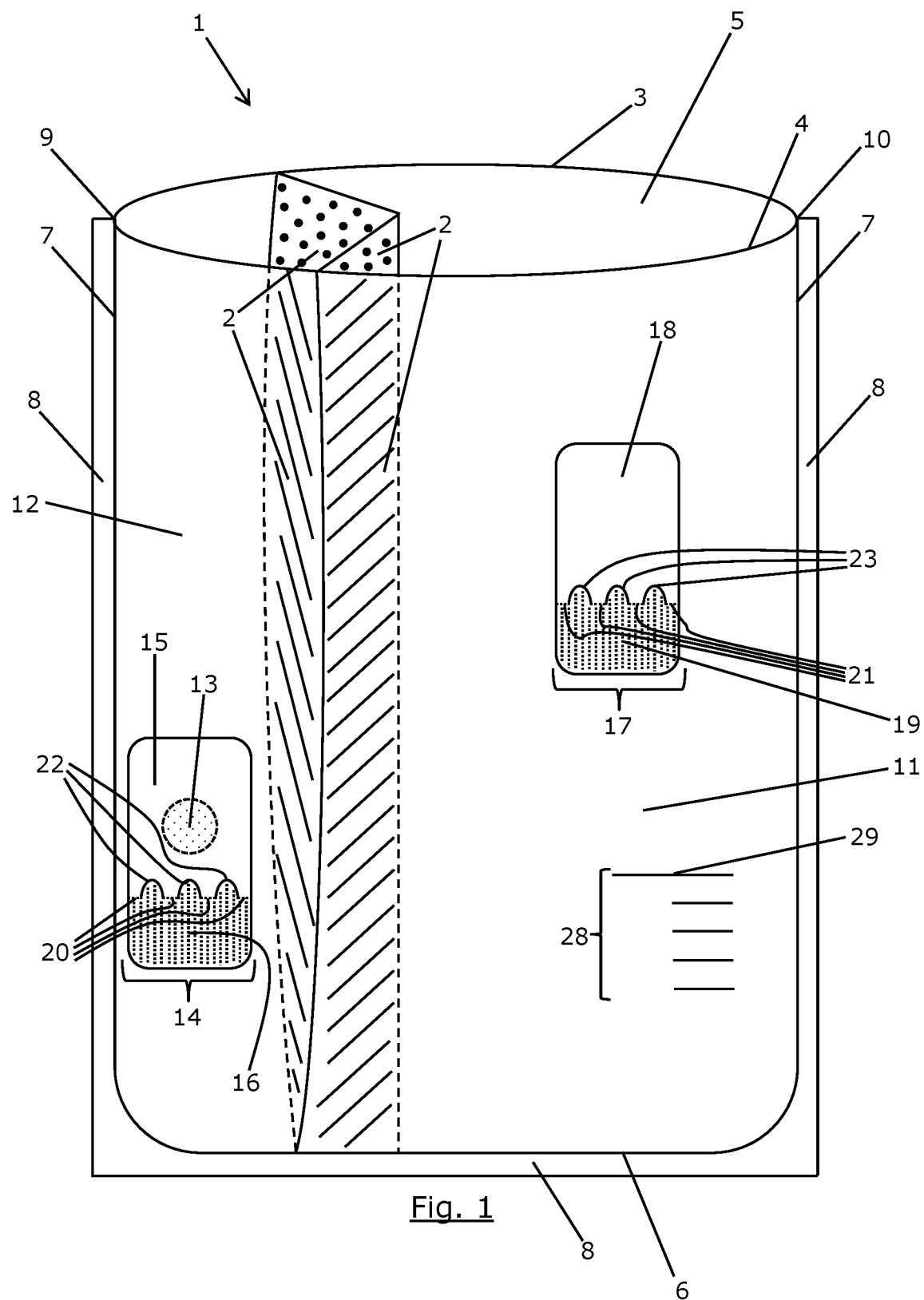
FIG. 1 is a schematic depiction of a front view of a filter bag according to the invention.

Turning more particularly to the drawings, a filter bag according to the present invention is indicated generally at 1 in FIG. 1. In this example, the filter bag 1 is made of a flexible polymeric material, such as polyethylene. The filter bag 1 has two walls or panels 3 and 4 that span from top to bottom between a mouth opening 5, which may alternatively be referred to simply as a mouth or an opening, and a bottom 6 of the filter bag 1 and that extend laterally between first and second interior lateral edges 7. The interior lateral edges 7 in this example of the filter bag 1 are substantially parallel to one another, but such is not necessary required.

In certain practices of the invention, the filter bag 1 can be formed by thermoforming two panels 3 and 4 of polyethylene, by creating a fold or sealed edge 8 that connects two lateral edges 9 and 10 of the panels 3 and 4 from the opening 5, along the first interior lateral edge 7, then along the bottom 6 of the filter bag 1, and along the second interior lateral edge 7. With the sealed lateral edges 7 and bottom 6, the panels 3 and 4 define an inner volume of the filter bag 1.

The filter bag 1 includes a membrane filter 2. The membrane filter 2 can likewise be formed from a polymeric material, such as polypropylene. The membrane filter 2 in one non-limiting practice of the invention has a cut-off threshold of about 280 microns. The filter membrane 2 separates the inner volume of the filter bag 1 into a sample receiving compartment 11 and a filtrate collection compartment 12. The filtrate collection compartment 12 has a volume less than a volume of the sample receiving compartment 11.

Figure 2:
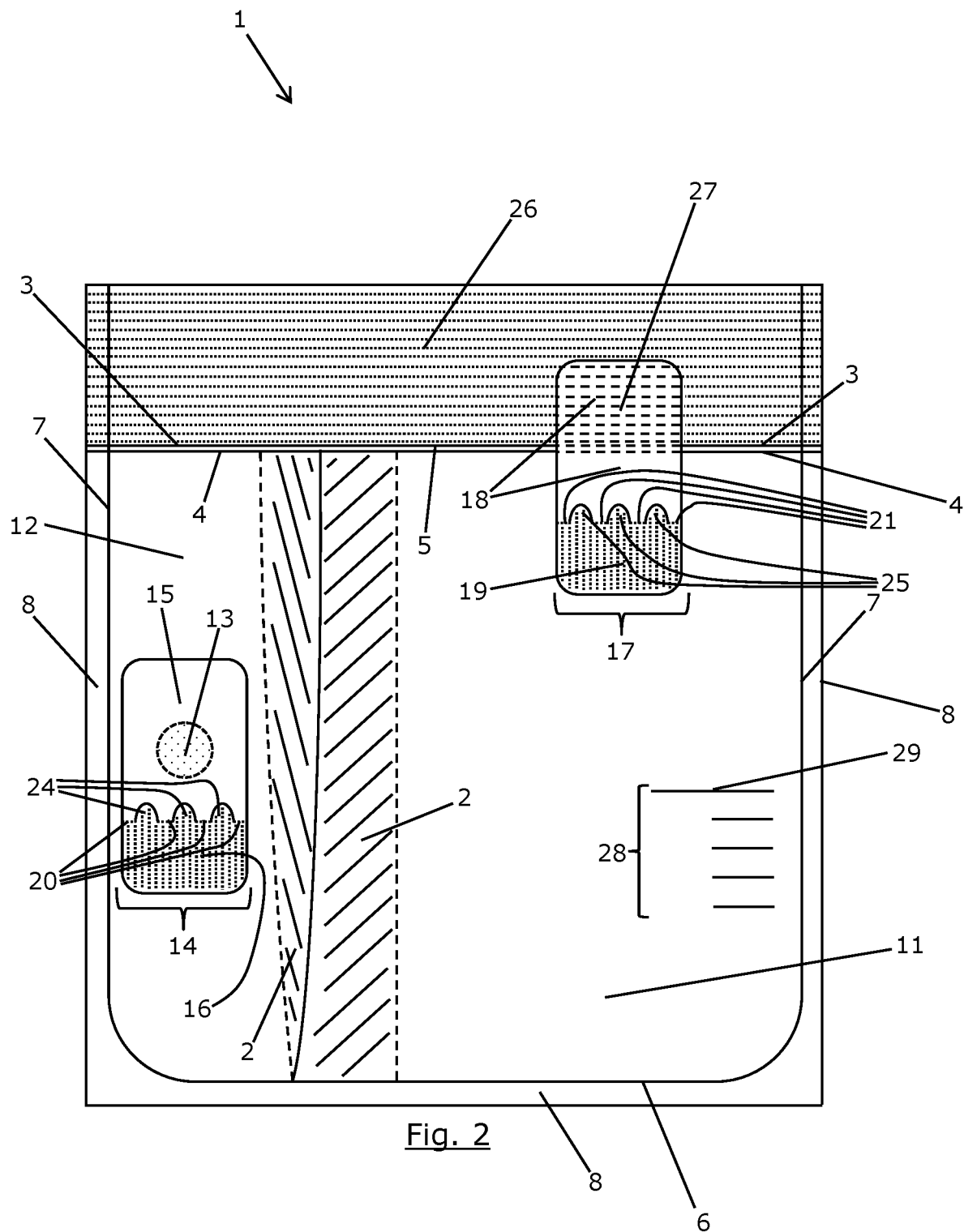
FIG. 2 is a schematic depiction of a front view of a filter bag according to the invention with a foldable portion, located on the side of the opening, folded against the wall of the filter bag with the orifice.

In the present, non-limiting example, the filter membrane 2 extends predominantly in a direction parallel to the interior lateral edges 7 of the panels 3 and 4 and of the filter bag 1 in general. The filter bag 1 has an orifice 13 that passes through the wall 4. The orifice 13 is substantially circular and, in this particular embodiment, has a diameter of approximately 1.5 cm. So configured, the orifice 13 allows for the insertion into the filtrate collection compartment 12 a majority of the interchangeable tips for sampling pipettes that are commonly commercially available. In FIGS. 1 and 2, for example, the indented circle delimiting the orifice 13 is located more proximal to the bottom 6 of the filter bag 1 and is relatively distal to the mouth opening 5 of the bag 1. For instance, in one example, the orifice 13 is disposed approximately 8.5 cm from the bottom 6. In addition, in one practice of the invention, for any volume of liquid contained in the filter bag 1 between a volume of 50 mL and a volume of 400 mL, it is possible to pipette a volume of filtrate through the orifice 13 using any one of the majority of commercially available pipette tips.

The filter bag 1 has a closure system, which is generally indicated at 14, for selectively adjusting the orifice 13 from a closed state to an open state. The closure system 14 has a moveable tab 15 and a stationary part 16 that is fixed relative to the wall 4. The moveable tab 15 selectively adheres to an area or areas of the wall 4 located about the periphery of the orifice 13. In the closed state, the moveable tab 15 provides an airtight seal for the orifice 13. The moveable tab 15 of the closure system 14 can be adjusted to an open configuration as in FIG. 3. There, the moveable tab 15 is folded away from the orifice 13, particularly toward the bottom 6 of the filter bag 6. When the moveable tab 15 of the closure system 14 is in the open state, the orifice 13 is clear and open, and access to the inner volume of the filtrate collection compartment 12 of the filter bag 1 through the orifice 13 is unobstructed.

The filter bag 1 also has a fastening system 17 for selectively closing the mouth opening 5 of the bag 1. The fastening system 17 in this embodiment has a moveable part comprising a moveable tab 18 and a stationary part 19 fixed to the wall 4 of the filter bag 1. The fastening system 17 has a first condition where the moveable tab 18 is in a first position engaged, such as by adhering, to the wall 4 and the mouth opening 5 of the filter bag 1 is open. When the moveable tab 18 is engaged with the wall 4, the fastening system 17 is in an open position, the mouth opening 5 is clear, and access to the inner volume of the filter bag 1 through the opening 5 is permitted.

In FIG. 1, therefore, the moveable tab 18 of the fastening system 17 is adhered to the wall 4 in the first position, and the fastening system 17 is thus in the first condition. The opening 5 is clear, and access to the inside of the filter bag 1 through the mouth opening 5 is unobstructed. When the opening 5 is clear, an operator may introduce, via the opening 5, a quantity of liquid, often predetermined, into filter bag 1. When the opening 5 is clear, an operator may introduce, via the opening 5, a sample to be analyzed in the sample receiving compartment 11.

In embodiments of the filter bag 1, the closure system 14 and the fastening system 17 are each founded on a panel of flexible material. For instance, the closure system 14 and the fastening system 17 can each be based on a polyester strip of material.

A separative limit 20, 22 separates the moveable tab 15 of the closure system 14 from the stationary part 16 of the closure system 14. In a potentially similar manner, a separative limit 21, 23 separates the moveable tab 18 of the fastening system 17 from the stationary part 19 of the fastening system 17. While they need not necessarily be, the separative limit 20, 22 of the of the closure system 14 in this embodiment is similar, perhaps substantially identical, to the separative limit 21, 23 of the fastening system 17.

The separative limits 20, 22 and 21, 23 are formed, on the one hand, by indentations 22, 23 and, on the other hand, by segments 20, 21 interposed between the indentations 22, 23. The indentations 22, 23 form a pattern 24, 25 as shown in FIG. 2 for the stationary parts 16, 19 of the closure system 14 and fastening system 17 respectively. The indentations 22, 23 have the effect of imposing separations between the moveable tabs 15, 18 and the stationary parts 16, 19 when folding the mobile tabs 15, 18 away from the wall 4, such as toward the bottom 6 of the filter bag 1. The separations between the moveable tabs 15, 18 and the stationary parts 16, 19 are made up of sets of segments 20, 21 that connect the ends of adjacent indentations 22, 23 and the ends of the outer indentations 22, 23 with outer edges of the panel forming the closure system 14 and the fastening system 17 toward the lateral interior edges 7.

Looking to FIG. 2, the filter bag 1 is illustrated wherein an upper, foldable portion 26 of the bag 1 contiguous with the mouth opening 5 is folded against the second wall 4 of the filter bag 1, which second wall 4 houses the orifice 13. The foldable portion 26 of the filter bag 1 is held against the wall 4 by the fastening system 17. More particularly, the moveable tab 18 is affixed to a surface portion 27 of the first wall 3 while the distal foldable portion 26 is effectively doubled over the portion of the filter bag 1 proximal to the foldable portion 26. When the moveable tab 18 of the fastening system 17 adheres to the wall 3 of the foldable portion 26, the fastening system 17 can be considered to be in a closed state. In this configuration, the mouth opening 5 is closed, and access to the inside of the filter bag 1 by the opening 5 is prevented.

When the opening 5 is closed, the filter bag 1 is in a suitable configuration to be placed in a lab blender. A lab blender can thus be operative to stir the filter bag 1, such as to promote the suspension of fragments and/or the solubilisation of portions or objects of a sample into a liquid present in the filter bag 1. With the distal foldable portion 26 maintained against the second wall 4 by the fastening system 17, the moveable tab 18, which is fixed to an area 27 of the first wall 3 of the foldable portion 26, prevents spillage of the liquid contained in the filter bag 1 while the same is being stirred, such as by a lab blender.

The stationary parts 16, 19 of the closure system 14 and the fastening system 17 respectively are irreversibly fixed to the wall 4 of the filter bag 1, such as by adhesive or any other irreversible fixing method. The moveable portions of the closure system 14 and the fastening system 17 in the form of the moveable tabs 15, 18 can be selectively retained relative to the wall 4 of the filter bag 1. Stated alternatively, the moveable tabs 15, 18 can be removably affixed to the wall 4 of the filter bag 1. Further stated alternatively, the moveable tabs 15, 18 can be fixed in a reversible way or manner to the wall 4 of the filter bag 1. As used herein, reference to fixing in a reversible way is intended to mean that the moveable tabs 15 and 18 can be selectively attached to and detached from the wall 4 of the filter bag 1, or, where applicable, the moveable tab 18 can be selectively attached to and detached from an area 27 of the wall 3 of the distal foldable portion 26. Except as the invention might be expressly limited by the claims, the removable, detachable, and reversible attachment can be carried out by an adhesive or any other detachable attachment.

FIG. 2 also illustrates the pattern 24, 25 of indentations 22, 23 between the stationary parts 16, 19 and the moveable tabs 15, 18. These indentations 22, 23 prevent the stationary parts 16, 19 of the closure system 14 and the fastening system 17 from peeling off of the wall 4 when the moveable tabs 15, 18 are detached from the wall 4, such as to be bent, folded, or pivoted toward the bottom 6 of the filter bag 1. Indeed, in addition to the indentations 22, 23, the stationary parts 16, 19 and the moveable tabs 15, 18, which again can be made from polymeric, potentially polyester, strips to form the closure system 14 and the fastening system 17 are connected by the segments 20, 21. The segments 20, 21 are weak compared to the overall separative limit 20, 21, 22, 23. Therefore, during the folding of the moveable tabs 15, 18, tangential shearing forces applied to the segments 20, 21 of the moveable tabs 15, 18 predominate and prevent the detachment of the mobile tabs 15, 18 beyond the separative limit 20, 21, 22, 23.

Figure 3:
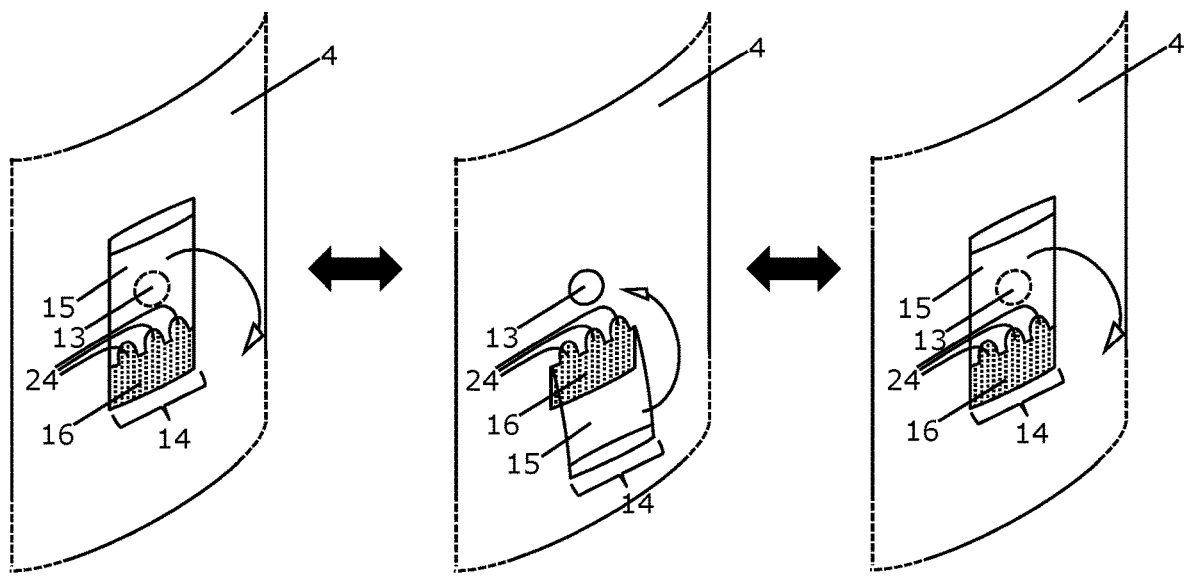
FIG. 3 is a schematic perspective representation of a closure system according to an embodiment of the invention.

Turning to FIG. 3, the closure system 14 is illustrated for its reversibility between a closed state where the moveable tab 15 is affixed to the wall 4 and its open state where the moveable tab 15 is detached and pivoted or folded away from the wall 4. In the closed state, the moveable tab 15 adheres to an area of the wall 4 surrounding the periphery of the orifice 13. In this case, the closure system 14 is in a closed configuration, and the moveable tab 15 provides an airtight seal for the orifice 13. The moveable tab 15 can be selectively detached from the wall 4 and folded or pivoted away from the wall 4 to the open state with the moveable tab 15 in this embodiment folded towards the bottom 6 of the filter bag 1 (shown in FIGS. 1 and 2, for instance). With the moveable tab 15 in the open configuration, the orifice 13 is clear, and access to the inside of the filter bag 1 through the orifice 13 is unobstructed. The moveable tab 15 can be selectively returned to the closed configuration by being reattached to the wall 4 to overlie and seal the orifice 13. In practice, the transition between the closed and open configurations can be easily carried out by an operator, potentially with just one or two fingers. It is preferred that the selective adjustment between closed and open configurations can be reversibly carried out plural times, such as at least 5 times.

Figure 4:
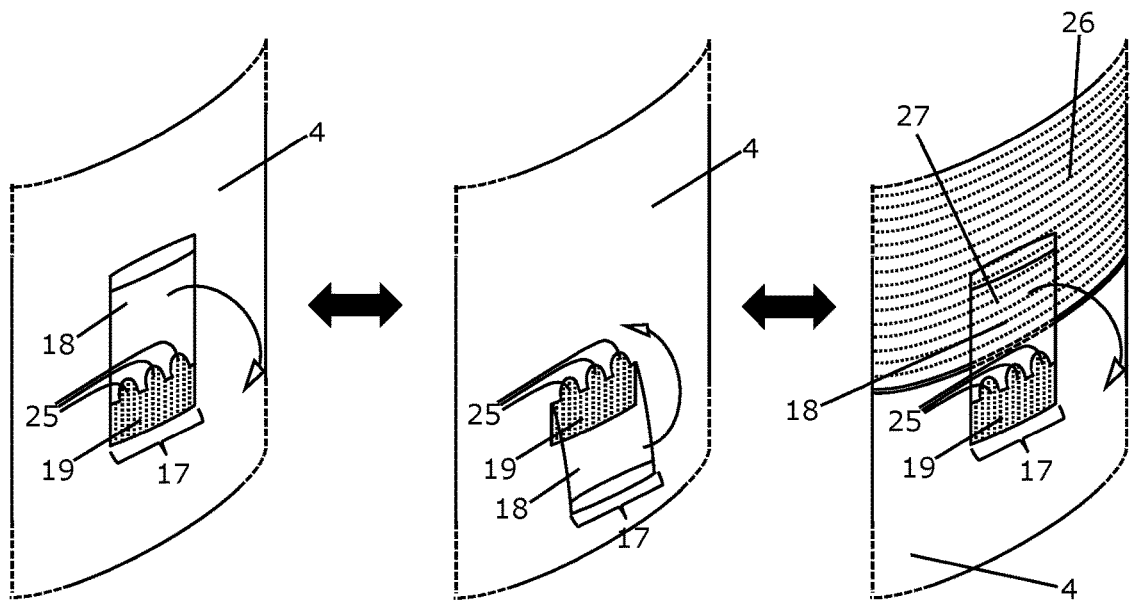
FIG. 4 is a schematic perspective representation of a fastening system according to an embodiment of the invention.

FIG. 4 illustrates the fastening system 17 for selectively and reversibly closing the mouth of the filter bag 1. Where the moveable tab 18 is removably affixed to the wall 4, the fastening system 17 is in an open configuration so that the opening 5 of the filter bag 1 is clear and open as in FIG. 1 and access to the inner volume of the filter bag 1 through the opening 5 is unobstructed. FIG. 4 also illustrates a folded configuration in which the moveable tab 18 of the fastening system 17 is detached from and folded away from the wall 4, such as toward the bottom 6 of the bag 1 (shown in FIG. 1, so that the opening 5 is clear and access to the inside of the filter bag 1 through the opening 5 is unobstructed, again as is shown in FIG. 1. Still further, FIG. 4 illustrates a configuration in which the foldable portion 26 of the bag 1 is folded over and the moveable tab 18 of the fastening system 17 is adhered to an area 27 of the first wall 3 of the foldable portion 26 so that the fastening system 17 is in a closed configuration and the mouth opening 5 is likewise closed.

With an implementation method complementary to the first method of development, a wall 3 or 4, such as the wall 4, of the filter bag 1 has a graduation marking 28 that includes an indication of a maximum level 29. When a liquid is introduced into the filter bag 1 and its quantity exceeds the maximum level 29, the handling of filter bag 1 with the closure system 14 is in an open position may induce spillage outside of the inner volume of the filter bag 1.

In certain practices of the invention, the moveable tabs 15, 18 of the closure system 14 and the fastening system 17 can be removable adhered to the wall 4 of the filter bag 1 and with respect to the moveable tab 18 to the wall 3 of the filter bag 1 by adhesive glue. The stationary parts 16, 19 of the closure system 14 and the fastening system 17 can likewise be adhered to the wall 4 of the filter bag 1 by adhesive glue. It is possible for the glue used for the moveable tabs 15, 18 to adhere to the wall 4 of the filter bag 1, or where applicable, for the moveable tab 18 to adhere to the wall 3 of the foldable portion 26 to be identical to the glue used to glue the stationary parts 16, 19 to the wall 4 of the filter bag 1.

When the moveable tabs 15, 18 are attached and detached, the straight or rectilinear segments 20, 21, which can be considered weak segments 20, 21, interposed between the indentations 22, 23 have two functions. First, they allow the moveable tabs 15, 18 to extend toward the stationary parts 16, 19. Second, they prevent the detachment of the stationary parts 16, 19.

Of course, the invention is not limited to the examples that have just been described. Improvements and variations may be made to these examples within the scope of the invention. The characteristics, shapes, variants, and implementation methods of the filter bag may be associated with each other in various combinations insofar as they are not incompatible or exclusive to each other.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express, or be interpreted to express, certain elements as means for performing a specific function, at times without the recital of structure or material. As the law demands, these claims shall be construed to cover not only the corresponding structure and material expressly described in this specification but also all equivalents thereof that might be now known or hereafter discovered.

What is claimed as deserving the protection of Letters Patent:

1. A filter bag comprising:
a wall structure wherein the wall structure defines an inner volume with a mouth opening, wherein the wall structure has a bottom, wherein the wall structure extends from the bottom to the mouth opening, and wherein the wall structure has a foldable portion contiguous with the mouth opening;
a membrane filter comprising a strip that extends from the bottom of the wall structure toward the mouth opening wherein the membrane filter separates the inner volume of the wall structure into a sample receiving compartment for receiving a sample and a filtrate collection compartment for receiving a filtrate;
an orifice in the wall structure in communication with the filtrate collection compartment;
a closure system with a closed state wherein access to the filtrate collection compartment through the orifice from outside of the bag is prevented and an open state wherein access to the filtrate collection compartment through the orifice from outside of the bag is permitted wherein the closure system comprises a tab wherein the tab comprises a stationary part fixed to the wall structure and a moveable part operative to seal the orifice when the closure system is in the closed state and to permit access to the filtrate collection compartment through the orifice from outside the filtrate collection compartment when the closure system is in the open state; and
a fastening system spaced from the mouth opening with a stationary part fixed to the wall structure and a moveable portion that can be detachably fixed to the wall structure of the filter bag, wherein the fastening system has a closed state wherein the foldable portion of the wall structure is folded over against the wall structure and the moveable portion of the fastening system is detachably fixed to the foldable portion of the wall structure folded over against the wall structure whereby the mouth opening is closed and access to the inner volume of the filter bag from exterior to the filter bag through the mouth opening is prevented and wherein the fastening system has an open state wherein the moveable portion of the fastening system is not fixed to the foldable portion of the wall structure, wherein the foldable portion of the wall structure is not folded over against the wall structure, and wherein access to the inner volume of the filter bag from exterior to the filter bag through the mouth opening is permitted.

2. The filter bag of claim 1 wherein the wall structure comprises a first wall and a second wall and wherein the stationary part of the closure system and the fastening system are fixed to the second wall of the wall structure.

3. The filter bag of claim 1 wherein the moveable part of the closure system has one or more detachable fixation areas operative to be selectively affixed to one or more fastening areas of the wall structure surrounding a periphery of the orifice.

4. The filter bag of claim 3 wherein, when the closure system is in the closed state, the one or more detachable fixation areas of the moveable part of the closure system are detachably fixed to the one or more fastening areas of the wall structure surrounding the periphery of the orifice.

5. The filter bag of claim 4 wherein, when the closure system is in the open state, the one or more detachable fixation areas of the moveable part of the closure system are detached from the one or more fastening areas of the wall structure surrounding the periphery of the orifice.

6. The filter bag of claim 2 wherein the stationary part of the closure system has one or more irreversible fixation areas irreversibly fixed to one or more irreversible fixation areas of the wall structure adjacent to the orifice.

7. The filter bag of claim 6 wherein the one or more irreversible fixation areas are disposed on the wall structure between the orifice and the bottom of the filter bag.

8. The filter bag of claim 7 wherein the filter bag has a longitudinal direction from the mouth opening of the filter bag to the bottom of the filter bag and wherein the moveable part of the closure system extends from the stationary part of the closure system in substantial alignment with the longitudinal direction of the filter bag.

9. A filter bag comprising:
a wall structure wherein the wall structure defines an inner volume with an opening, wherein the wall structure has a bottom, and wherein the wall structure extends from the bottom to the opening;
a membrane filter comprising a strip that extends from the bottom of the wall structure toward the opening wherein the membrane filter separates the inner volume of the wall structure into a sample receiving compartment for receiving a sample and a filtrate collection compartment for receiving a filtrate;
an orifice in the wall structure in communication with the filtrate collection compartment; and
a closure system with a closed state wherein access to the filtrate collection compartment through the orifice from outside of the bag is prevented and an open state wherein access to the filtrate collection compartment through the orifice from outside of the bag is permitted, wherein the closure system comprises a tab and a stationary part fixed to the wall structure, wherein the tab comprises a moveable part operative to seal the orifice when the closure system is in the closed state and to permit access to the filtrate collection compartment through the orifice from outside the filtrate collection compartment when the closure system is in the open state, and wherein the stationary part of the closure system has one or more irreversible fixation areas irreversibly fixed to one or more irreversible fixation areas of the wall structure adjacent to the orifice and further comprising a separative limit between the moveable part of the closure system and the stationary part of the closure system wherein at least a portion of the separative limit is curved.

10. A filter bag comprising:
a wall structure wherein the wall structure defines an inner volume with an opening, wherein the wall structure has a bottom and wherein the wall structure extends from the bottom to the opening;
a filter that extends from the bottom toward the opening wherein the filter separates the inner volume into a sample receiving compartment for receiving a sample and a filtrate collection compartment for receiving a filtrate;

an orifice in the wall structure in communication with the filtrate collection compartment;

a closure system with a closed state wherein access to the filtrate collection compartment through the orifice from outside of the bag is prevented and an open state wherein access to the filtrate collection compartment through the orifice from outside of the bag is permitted, wherein the closure system comprises a tab wherein the tab comprises a moveable part operative to seal the orifice when the closure system is in the closed state and to permit access to the filtrate collection compartment through the orifice from outside the filtrate collection compartment when the closure system is in the open state, wherein the closure system further comprises a stationary part fixed to the wall structure, wherein the stationary part of the closure system has one or more irreversible fixation areas irreversibly fixed to one or more irreversible fixation areas of the wall structure adjacent to the orifice;

a separative limit between the moveable part of the closure system and the stationary part of the closure system wherein at least a portion of the separative limit is curved and wherein the separative limit between the moveable part of the closure system and the stationary part of the closure system includes convex parts that extend toward the moveable part of the closure system, the convex parts formed by a pattern of convex shapes of the stationary part of the closure system that extend toward the moveable part of the closure system.

11. The filter bag of claim 3 wherein the one or more detachable fixation areas of the closure system are detachably affixed to the wall structure by adhesive.

12. The filter bag of claim 1, wherein the stationary part of the fastening system is fixed to one or more areas of irreversible fastening on the wall structure and wherein the moveable portion of the fastening system is operative so that, when the fastening system is in the open state, the moveable portion of the fastening system can be detachably affixed to one or more detachable fastening areas on the wall structure contiguous with the one or more areas of irreversible fastening on the wall structure to which the stationary part of the fastening system is fixed or folded away from the wall structure.

13. A filter bag comprising:

a wall structure wherein the wall structure defines an inner volume with an opening, wherein the wall structure has a bottom, wherein the wall structure extends from the bottom to the opening, and wherein the wall structure has a foldable portion contiguous with the opening;

a membrane filter comprising a strip that extends from the bottom of the wall structure toward the opening wherein the membrane filter separates the inner volume of the wall structure into a sample receiving compartment for receiving a sample and a filtrate collection compartment for receiving a filtrate;

an orifice in the wall structure in communication with the filtrate collection compartment; and a closure system with a closed state wherein access to the filtrate collection compartment through the orifice from outside of the bag is prevented and an open state wherein access to the filtrate collection compartment through the orifice from outside of the bag is permitted;

a fastening system with a moveable portion detachably fixed to the wall structure of the filter bag wherein the fastening system has a closed state wherein access to the inner volume of the filter bag from exterior to the filter bag through the opening is prevented and an open state wherein access to the inner volume of the filter bag from exterior to the filter bag through the opening is permitted, wherein the fastening system comprises the moveable portion and a stationary part, wherein the stationary part is fixed to one or more areas of irreversible fastening on the wall structure, and wherein the moveable portion is operative so that, when the fastening system is in the open state, the moveable portion can be detachably affixed to one or more detachable fastening areas on the wall structure contiguous with the one or more areas of irreversible fastening on the wall structure to which the stationary part is fixed or folded away from the wall structure and, when the fastening system is in the closed state, the moveable portion is detachably fixed to one or more detachable fastening areas of the foldable portion of the wall structure;

wherein the filter bag has a maximum liquid level that the filter bag is configured to receive wherein the orifice is located between the maximum liquid level and an irreversible fastening area of the fastening system located closest to the bottom of the filter bag, and wherein a detachable fastening area of the moveable portion of the fastening system is located between the orifice in the wall structure and the opening of the filter bag.

* * * * *